(12) United States Patent
Nose et al.

(10) Patent No.: US 7,680,410 B2
(45) Date of Patent: Mar. 16, 2010

(54) IMAGING DEVICE EQUIPPED WITH FLASH UNIT

(75) Inventors: Syuji Nose, Saitama (JP); Norifumi Iimura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 875 days.

(21) Appl. No.: 11/508,305

(22) Filed: Aug. 23, 2006

(65) Prior Publication Data
US 2007/0047945 A1    Mar. 1, 2007

(30) Foreign Application Priority Data
Aug. 23, 2005    (JP) ............................. 2005-241731

(51) Int. Cl.
*G03B 15/05* (2006.01)
(52) U.S. Cl. .................................... 396/157
(58) Field of Classification Search ................ 396/157; 348/370, 371
See application file for complete search history.

(56) References Cited

U.S. PATENT DOCUMENTS

| | | | | |
|---|---|---|---|---|
| 5,006,879 A | * | 4/1991 | Takagi et al. ................. | 396/162 |
| 6,067,422 A | * | 5/2000 | Tokunaga et al. ............ | 396/157 |
| 6,349,175 B1 | * | 2/2002 | Tokunaga ..................... | 396/157 |
| 7,254,321 B2 | * | 8/2007 | Tokunaga ..................... | 396/61 |
| 7,589,784 B2 | * | 9/2009 | Chiba et al. .................. | 348/371 |
| 2002/0197071 A1 | * | 12/2002 | Hofer ........................... | 396/155 |
| 2005/0001926 A1 | * | 1/2005 | Lee et al. ...................... | 348/371 |
| 2008/0165265 A1 | * | 7/2008 | Chiba et al. .................. | 348/308 |

FOREIGN PATENT DOCUMENTS

JP    06-303504 A    10/1994

* cited by examiner

*Primary Examiner*—W. B. Perkey
(74) *Attorney, Agent, or Firm*—Sughrue Mion, PLLC (57) ABSTRACT

Upon depression of a release button, pre-shooting is performed before regular shooting. In the pre-shooting, flash of a predetermined amount is emitted and exposure of an image sensor is performed. A shooting frame is divided into small areas. As to each of the small areas, subject brightness of pre-emission and subject brightness of non-emission are detected to calculate a difference between them. The small area having the maximum difference is selected as a main-subject area. The brightness of the non-emission of the selected small area, which is the brightness of an ambient light applied to the main subject, is set as reference brightness. A correction amount of the flash amount of the regular shooting corresponding to the reference brightness is derived with reference to an LUT. In the regular shooting, regular emission is performed during a regular-emission time corresponding to the collected flash amount.

12 Claims, 5 Drawing Sheets

IMAGING DEVICE EQUIPPED WITH FLASH UNIT

FIELD OF THE INVENTION

The present invention relates to an imaging device equipped with a flash unit.

BACKGROUND OF THE INVENTION

Imaging devices such as an electronic still camera, a camera-equipped cell-phone and so forth are widely used. This kind of the imaging device takes a subject image with an image sensor of a CCD image sensor and so forth, and records obtained image data in a recording medium of a memory card and so forth. Some of the imaging devices are equipped with a flash unit (see Japanese Patent Laid-Open Publication No. 6-303504, for instance). The imaging device described in this Publication No. 6-303504 controls a flash-light amount in accordance with ambient light, which is applied to a subject, to prevent overexposure at a time when flash light is applied to the subject in addition to the ambient light.

The imaging device described in the above-noted Publication No. 6-303504 integrates an ambient-light amount with an external sensor. When the integrated amount has reached a prescribed level, flash emission is terminated to prevent overexposure. However, since a light receiving area of the external sensor corresponds to all of a shooting frame (predetermined angle of view) or to a central part thereof, the ambient-light amount integrated by the external sensor does not always indicate a correct status of the ambient light applied to a main subject, depending on a location and a size of the main subject taken within the frame. Thus, when the ambient light applied to the main subject is bright, overexposure of the main subject occurs. As a result, there arises a problem in that chroma clip of highlight is caused. In contrast, when the ambient light is dark (few), underexposure of the main subject occurs. As a result, there arises a problem in that the main subject is darkly taken.

SUMMARY OF THE INVENTION

In view of the foregoing, it is a primary object of the present invention to provide an imaging device in which a flash amount is properly controlled in accordance with ambient light applied to a main subject.

In order to achieve the above and other objects, the imaging device according to the present invention comprises a flash unit, a signal extractor, a light-amount corrector and a light-amount controller. The imaging device has an image sensor for taking a subject image. The flash unit emits a flash before regular shooting to perform pre-emission when the regular shooting is instructed. In addition, the flash unit emits the flash in synchronization with the regular shooting to perform regular emission. The signal extractor extracts an image signal of the subject image taken by the image sensor during a period of non-emission elapsing just before the pre-emission and the regular shooting without pre-emission. On the basis of the image signal, the light-amount corrector calculates a difference between subject brightness of the non-emission and subject brightness of the pre-emission with respect to each of divided small areas of a shooting frame of the image sensor. Further, the light-amount corrector selects the small area, which has the maximum brightness difference, to derive a correction amount of a flash amount of the regular emission on the basis of the subject brightness of the non-emission of the selected small area. The light-amount controller controls the flash unit so as to perform the regular emission with the flash amount corrected in accordance with the correction amount derived by the light-amount corrector.

In another embodiment, the imaging device comprises a flash unit, a signal extractor, a light-amount corrector and a light-amount controller. The imaging device has an image sensor for taking a subject image. The flash unit emits a flash before regular shooting to perform pre-emission when the regular shooting is instructed. In addition, the flash unit emits the flash in synchronization with the regular shooting to perform regular emission. The signal extractor extracts an image signal of the subject image taken by the image sensor during a period of non-emission elapsing just before the pre-emission and the regular shooting without pre-emission. On the basis of the image signal, the light-amount corrector calculates a difference between subject brightness of the non-emission and subject brightness of the pre-emission with respect to each of divided small areas of a shooting frame of the image sensor. Further, the light-amount corrector selects the small areas, which have the brightness difference included within a predetermined EV value from the maximum brightness difference, to derive a correction amount of a flash amount of the regular emission on the basis of the mean subject brightness of the non-emission of the selected small areas. The light-amount controller controls the flash unit so as to perform the regular emission with the flash amount corrected in accordance with the correction amount derived by the light-amount corrector.

According to the imaging device of the present invention, the small area having the maximum brightness difference is selected as an image area of a main subject, and the flash amount of the regular emission is corrected on the basis of the brightness of the non-emission of the selected small area. Thus, the flash amount is properly controlled in accordance with an ambient light applied to the main subject.

The small areas having the brightness difference which is within the predetermined EV value from the maximum brightness difference may be selected as the image area of the main subject, and the flash amount of the regular emission may be corrected on the basis of the brightness of the non-emission of the selected small areas. Also in this case, the flash amount is properly controlled in accordance with the ambient light applied to the main subject.

DESCRIPTION OF THE PREFERRED EMBODIMENTS

Figure 1:
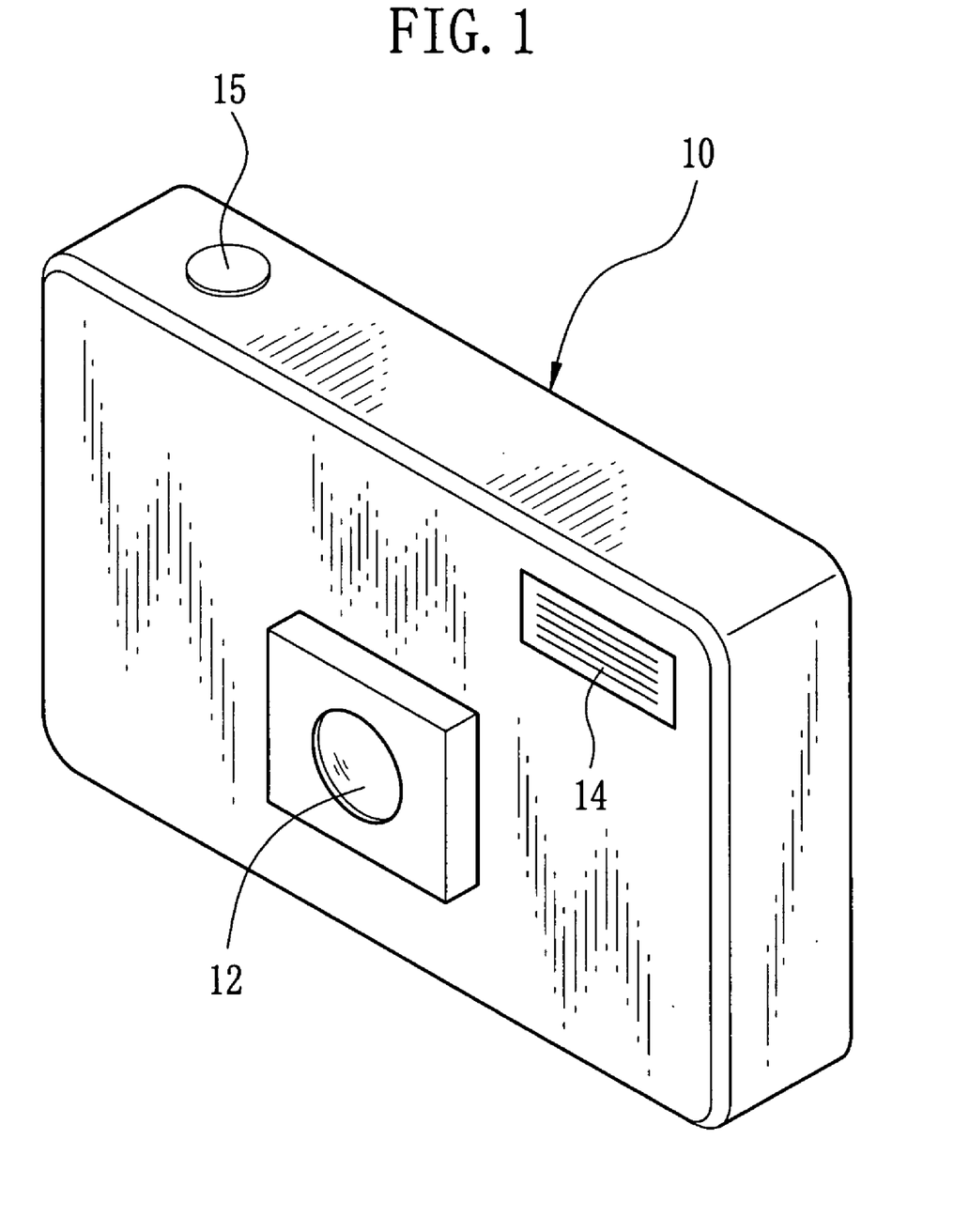
FIG. 1 is a perspective view showing an electronic still camera of a first embodiment according to the present invention.

In FIG. 1 showing an electronic still camera 10 of the present invention, which is regarded as an imaging device, a front side thereof is provided with a taking lens unit 12 and a flash window 14 for radiating flash light toward a subject. A release button 15 is disposed on a top side of the electronic still camera 10. By depressing the release button 15, a still image of one frame is taken. Digital data obtained by shooting is recorded in a memory card 16 (see FIG. 2) contained in the electronic still camera 10.

A rear side of the electronic still camera 10 is provided with an LCD (Liquid Crystal Display) 18 (see FIG. 2), operating buttons for performing various kinds of setting of the electronic still camera 10, and so forth. By handling the operating buttons while the LCD 18 displays a menu, it is possible to change a shooting mode and a reproducing mode and to select a flash mode. As to the flash mode, for example, it is possible to select a low-brightness automatic flash mode in which the flash is automatically emitted at a time when subject brightness is a predetermined level or less, a compulsory flash mode in which the flash is compulsory emitted, and a flash prohibition mode in which the flash emission is prohibited.

In a case of shooting with flash emission (hereinafter referred to as flash shooting), pre-shooting and regular shooting are performed. The pre-shooting is performed for the purpose of deriving a correction amount of the flash amount of the flash emission (hereinafter referred to as regular emission) to be performed at the time of regular-shooting. Exposure is performed with flash emission (hereinafter referred to as pre-emission) of a proper flash amount to obtain brightness data of a pre-emission time. In addition, brightness data of a non-emission time is obtained when a through image is taken without flash emission. Difference between the brightness data of the pre-emission time and the brightness data of the non-emission time is calculated with respect to each of small areas described later. The small area having the maximum difference is regarded as an area of a main subject. On the basis of the non-emission brightness data of the main-subject area, namely on the basis of the brightness data of the ambient light applied to the main subject, the correction amount of the flash amount of the regular emission is derived. Incidentally, the brightness data of the non-emission time (through-image taking time), which is used for calculating the above-mentioned difference, is obtained just before the pre-emission is performed.

In the regular shooting, a period of the regular emission is controlled in accordance with the correction amount determined in the pre-shooting to take a still image. The image data of the taken still image is recorded in the memory card 16. By the way, in this embodiment, the regular shooting is performed after performing the pre-shooting in response to full depression of the release button 15. However, the pre-shooting may be performed in response to half depression of the release button 15, and after that, the regular shooting may be performed in response to full depression of the release button 15.

Figure 2:
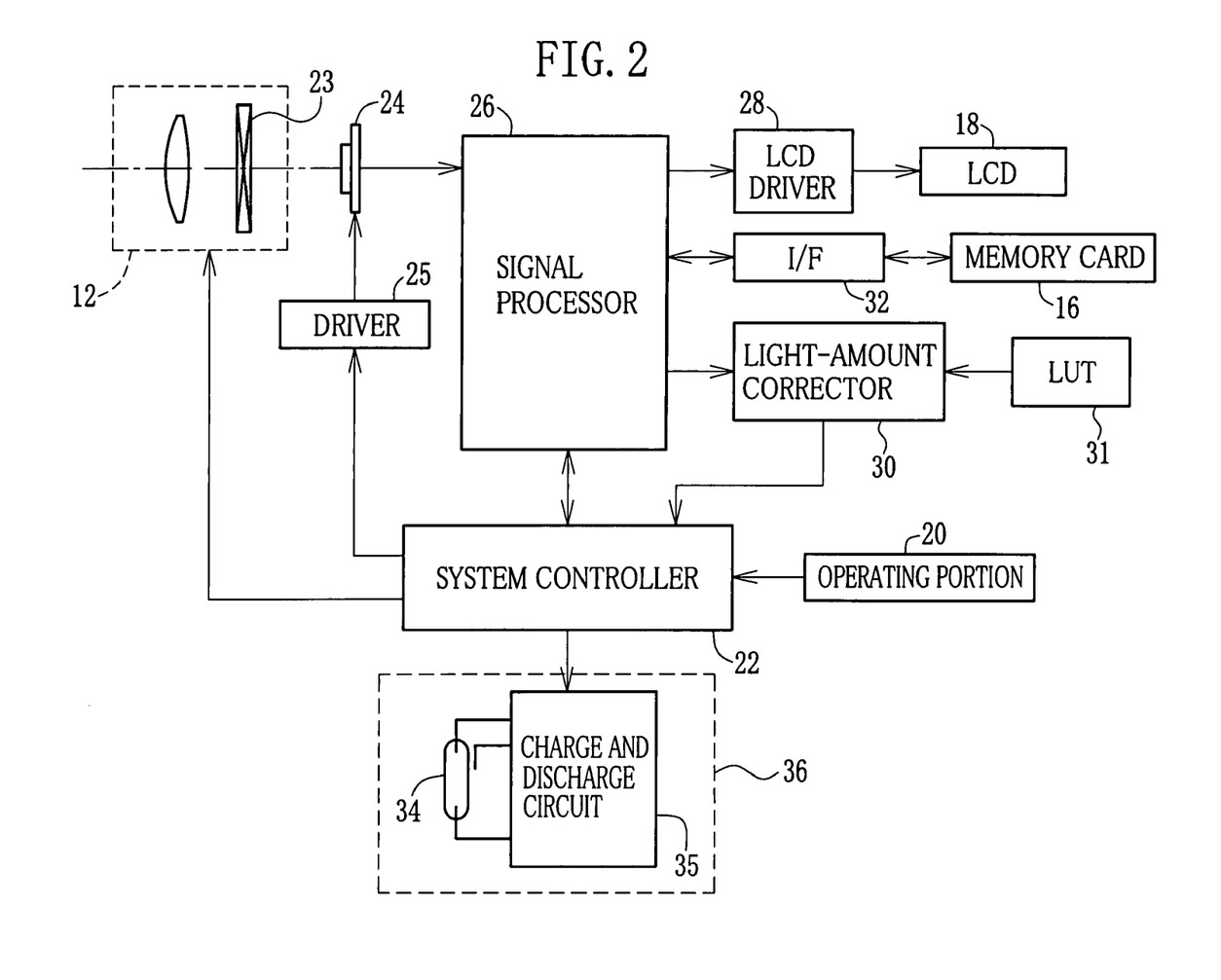
FIG. 2 is a block diagram showing an electrical structure of the electronic still camera.

FIG. 2 shows an electrical structure of the electronic still camera 10. An operating portion 20 outputs operational signals in response to operations of the release button 15 and the operating buttons. A system controller 22 controls each section of the electronic still camera 10 in accordance with the operational signals outputted from the operating portion 20.

The taking lens unit 12 has a focus adjusting mechanism and a shutter device 23 working as a stop and so forth. The taking lens unit 12 is controlled by the system controller 22. Behind the taking lens unit 12, is disposed a CCD image sensor 24, on a light-receiving surface of which a large number of pixels are arranged. The CCD image sensor 24 is activated by a driver 25. As is well known, the CCD image sensor 24 converts a subject image, which is formed on the light-receiving surface by the taking lens unit 12, into an analog image signal to be outputted. In this embodiment, shooting is performed by using the CCD image sensor. However, this image sensor is not exclusive. An image sensor of CMOS-type may be used, for instance.

For the image signal, a signal processor 26 performs various processes of noise removal, amplification, conversion to image data, white balance, gamma correction, data compression and so forth. The processes of the noise removal, the amplification, the conversion to image data, the white balance and the gamma correction are performed under the shooting mode. The processed image data is sequentially transferred to an LCD driver 28. Thereupon, the subject image currently taken is displayed on the LCD 18 as a through image.

For the image signals obtained during the pre-shooting and the through-image shooting, the signal processor 26 performs the processes of the noise removal, the amplification and the conversion to image data. After that, the processed image data is transferred to a light-amount corrector 30 described later. Meanwhile, for the image signal obtained during the regular shooting, the signal processor 26 performs the processes of the noise removal, the amplification and the conversion to the image data. Successively, the image processor 26 performs the processes of the white balance and the gamma correction. Further, the data compression is performed and the compressed data is recorded in the memory card 16 via an interface circuit 32. Incidentally, the recording medium is not limited to the memory card and various recording media may be used. The image data may be recorded in an internal memory of the electronic still camera 10.

Under the reproducing mode, the image data is read out of the memory card 16 via the interface circuit 32 and is processed in the signal processor 26. The processed image data is transferred to the LCD driver 28. Thereupon, the image recorded in the memory card 16 is displayed on the LCD 18.

The image processor 26 comprises a circuit for detecting the subject brightness on the basis of the image data and for detecting contrast of the image data. Information of the detected subject brightness and information of the detected contrast are respectively sent to the system controller 22. On the basis of the subject-brightness information, the system controller 22 controls an electronic shutter speed of the CCD image sensor 24 and a stop of the taking lens unit 12. On the basis of the contrast information, the system controller 22 controls focus adjustment of the taking lens unit 12.

A flash discharge tube 34 is disposed behind the flash window 14 and is connected to a charge and discharge circuit 35 composed of a main capacitor, a charge circuit, a trigger circuit, a flash stop circuit, a flash-amount adjusting circuit and so forth. The charge circuit charges the main capacitor up to a high voltage. The trigger circuit applies a trigger voltage to the flash discharge tube 34 to commence light emission to be caused by the charge stored in the main capacitor. The flash stop circuit terminates the light emission of the flash discharge tube 34. The flash-amount adjusting circuit regulates the flash amount of the pre-emission to a prescribed amount. The charge and discharge circuit 35 and the flash discharge tube 34 compose a flash unit 36.

The system controller 22 sends a pre-emission signal to the charge and discharge circuit 35 at the time of pre-shooting. In response to an input of the pre-emission signal, the charge and discharge circuit 35 activates the flash discharge tube 34 for a predetermined period to perform the pre-emission with the prescribed flash amount. The pre-emission may be performed with the flash amount (light-emission period) by which it is possible to determine the correction amount of the flash amount of the regular emission. A number of the light emission may be one or more. Incidentally, it is preferable that the flash amount and a light-emission pattern are determined so as not to mistake the pre-emission for completion of shooting. The pre-emission is performed in synchronism with exposure (hereinafter referred to as pre-exposure) of the CCD image sensor 24 at the time of pre-shooting.

At the time of regular shooting, the system controller 22 inputs a regular-emission start signal into the charge and discharge circuit 35. When a regular-emission period has passed from the input of this start signal, a regular-emission stop signal is inputted. The charge and discharge circuit 35 commences the light emission of the flash discharge tube 34 in response to the input of the regular-emission start signal. After that, the charge and discharge circuit 35 terminates the light emission in response to the input of the regular-emission stop signal. In this way, is performed the regular emission in which the flash is emitted during the regular-emission period.

The charge and discharge circuit 35 is adapted to be capable of controlling the flash amount in accordance with the light-emission period. For example, main capacitors are provided for the pre-emission and the regular emission respectively, and charge voltages of the main capacitors are controlled so as to be kept constant. Incidentally, the flash amount emitted form the flash discharge tube 34 may be detected by using a sensor disposed for directly receiving the flash light emitted from the flash discharge tube 34. In this case, the light emission is terminated when the flash amount detected by the sensor has reached the prescribed amount.

The light-amount corrector 30 specifies the small area, which is described later and is regarded as an area where the main subject is taken, on the basis of the image data obtained by the pre-exposure (accompanying the pre-emission of the flash) of the CCD image sensor 24 and the image data of the through image (taken without the flash). Based on the brightness of the through image of the specified small area, a look-up table (LUT) 31 is referred to determine the correction amount of the regular-emission period. The light-amount corrector 30 sequentially performs a brightness calculating process, a reference setting process and a correction-amount determining process.

The LUT 31 stores correction data representing a relationship between the brightness of the ambient light illuminating the main subject and the proper correction amount of the flash amount of the regular emission. The correction data may be theoretically derived in consideration of light-emission properties of the flash unit 36 equipped in the electronic still camera 10. However, it is preferable that the correction data is derived by performing trial shooting of many times in advance. In this case, a flash unit to be used is of the same type with the flash unit 36 equipped in the electronic still camera 10.

Figure 3:
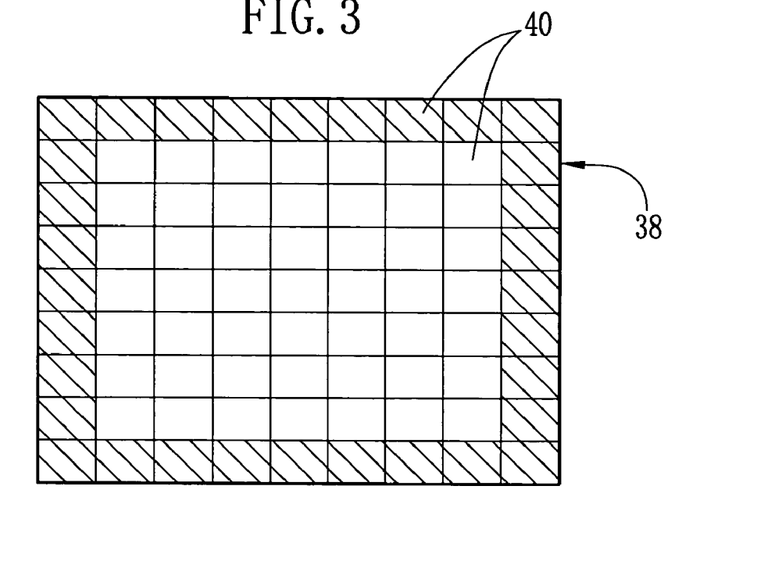
FIG. 3 is an explanatory illustration showing a shooting frame divided into small areas.

In the brightness calculating process, a shooting frame 38 of the CCD image sensor 24 is divided into the small areas 40 of n×m (9×9 in this embodiment) such as shown in FIG. 3, and the brightness data is calculated in accordance with subject brightness of each small area 40. The brightness data of the pre-exposure is calculated by using the image data of the pixels included in the small area 40 to be calculated, in accordance with the subject brightness of this small area 40 illuminated by the pre-emission. The brightness data of the through-image shooting is calculated by using the image data of the pixels included in the small area 40, in accordance with the subject brightness of this small area 40 illuminated by the ambient light (fixed light).

The reference setting process is performed for setting reference-brightness data, on the basis of which the correction amount of the flash amount to be emitted during the regular emission is derived. In this embodiment, the brightness data of the through-image shooting is subtracted from the brightness data of the pre-exposure with respect to each of the small areas 40. The small area 40 of which the subtracted value is maximum is selected as the area where the main subject is taken. The brightness data of the through-image shooting of the selected small area is regarded as the reference-brightness data. When plurality of the small areas 40 have the maximum subtracted value, the brightness data of the through-image shooting of these small areas are averaged, and the averaged data is regarded as the reference-brightness data.

In the correction-amount determining process, the LUT 31 is referred to for deriving the correction amount of the flash amount of the regular emission, which corresponds to the reference-brightness data. In deriving the correction amount, an imaging sensitivity and the stops of the pre-exposure and the regular emission are considered.

At the time of shooting, it is extremely rare that framing is performed so as to locate the main subject at a peripheral portion of the shooting frame. On the contrary, it is highly likely that the flash light is strongly reflected by a non-main subject located at the peripheral portion and the flash amount is improperly calculated. For this reason, in this embodiment, the small areas 40 of an edge portion of the shooting frame 38, which are designated by hatching in FIG. 3, are excluded from the process of the light-amount corrector 30. In virtue of this, operational throughput decreases and it is possible to reduce the likelihood of the improper flash amount.

Figure 4A:
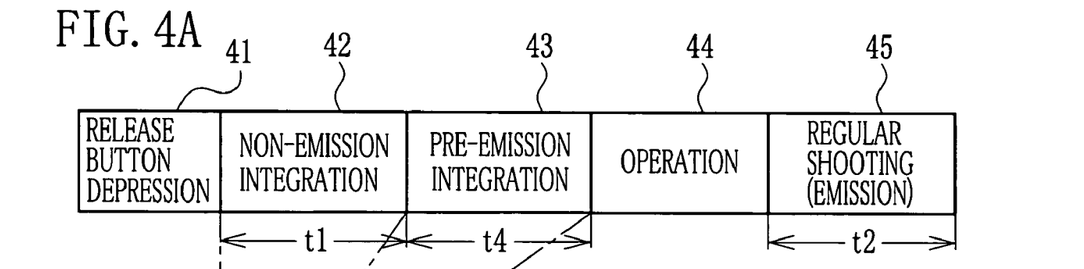
FIGS. 4A and 4B are explanatory illustrations showing time-lag reduced by shortening exposure times of non-emission and pre-emission.
Figure 4B:
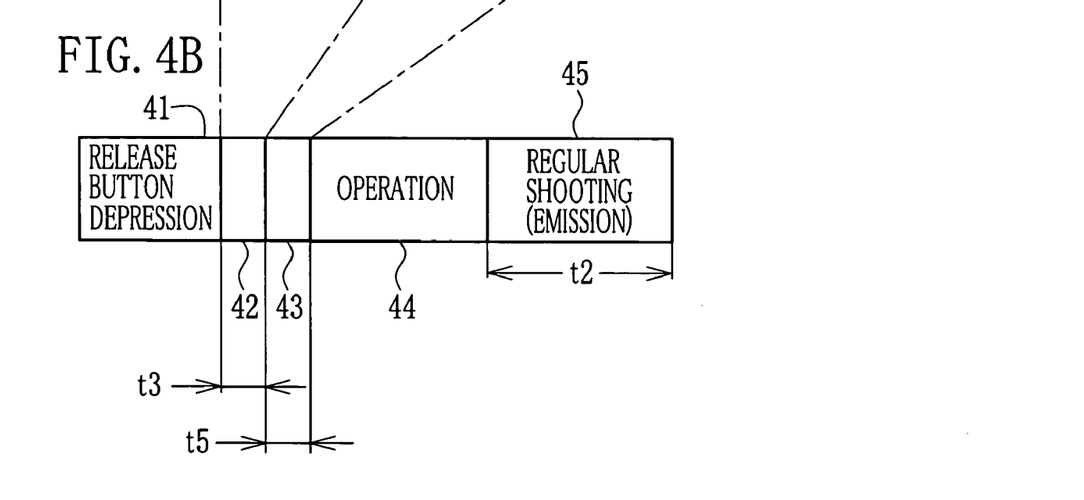

When the flash shooting is performed, the steps of release-button depression 41, non-emission integration 42, pre-emission integration 43, operation 44 (for deriving the flash correction amount) and regular shooting 45 are executed as shown in FIG. 4A. A period of the non-emission integration 42, namely an exposure time t1 of the non-emission, during which integration of the CCD 24 is carried out, is required to be identical with an exposure time t2 of the regular shooting 45 for the purpose of confirming an influence of the ambient light. In this regard, the exposure time means charge accumulation time. When the exposure time t2 of the regular shooting 45 is long (shutter speed is slow), shooting time-lag (from the depression of the release button until actual completion of exposure) is elongated. In this embodiment, as shown in FIG. 4B, an exposure time t3 of the non-emission is set to 12.5 ms when the exposure time t2 of the regular shooting 45 is 50 ms, for example. The CCD integration value obtained during the exposure time t3 is quadruplicated (50/12.5=4) to derive the CCD integration value to be obtained during the actual exposure time t1 (=t2). In other words, an actual exposure time of the image sensor of the non-emission is set so as to be shorter than a proper exposure time. The image signal obtained during the actual exposure time and outputted from the image sensor is multiplied by a ratio of the actual exposure time to the proper exposure time to correct the image signal. From the corrected image signal, the subject brightness of the non-emission is calculated. Incidentally, the step of the non-emission integration may be executed just after the step of the pre-emission integration.

Similarly, a period of the pre-emission integration 43, namely an exposure time t4 of the pre-emission is set to an exposure time t5, which is shorter than the exposure time t2 of the regular shooting. The pre-emission period of the flash unit 36 is sufficiently short in comparison with the exposure time t2 of the regular shooting and is several tens of microseconds. Thus, if the exposure time t4 (during which the integration value is obtained) of the pre-emission is shortened, difference is hardly caused except the influence affected by the ambient light at that time. In this regard, the influence of the ambient light is remarkably small in comparison with the flash amount. Therefore, there is no influence for the brightness data obtained during the pre-exposure (pre-emission).

An operation of the above structure is described below. For performing the shooting, a power supply of the electronic still camera 10 is turned on and the shooting mode is selected. Upon selection of the shooting mode, it is stated to activate the CCD image sensor 24.

The subject image taken by the respective pixels of the CCD image sensor is outputted as the image signal, which is sent to the signal processor 26 and for which the noise removal, the amplification and the conversion to the image data are performed. After that, the processes of the white balance and the gamma correction are performed for the converted image data. The processed image data is transferred to the LCD driver 28. The exposure of the CCD image sensor 24 is repeated and the image data obtained by the exposure is sequentially transferred to the LCD driver 28. In this way, the currently taken subject image is displayed on the LCD 18 as the through image of the non-emission shooting performed without the flash light.

Meanwhile, the image processor 26 detects the subject brightness and the contrast of the currently taken image. Results of the detection are sent to the system controller 22 as the contrast information and the subject-brightness information. On the basis of the contrast information, a focus point of the taking lens unit 12 is adjusted so as to make the contrast of the currently taken subject image maximum. Thus, the currently taken subject comes into focus. Since the focus adjustment is performed as needed, the focus is adjusted in association with a change of a shooting distance to the subject. Further, on the basis of the subject-brightness information, are adjusted the electronic shutter speed of the CCD image sensor 24 and the stop of the taking lens unit 12 so as to make the currently taken subject have proper exposure.

In performing the shooting, the flash mode is selected, and then, a frame is fixed during observation of the through image displayed on the LCD 18. After fixing the frame, the release button 15 is depressed. When the compulsory flash mode is selected as the flash mode or when the low-brightness automatic flash mode is selected under the condition that the subject brightness is a predetermined level or less, flash shooting is performed in response to the depression of the release button 15.

Figure 5:
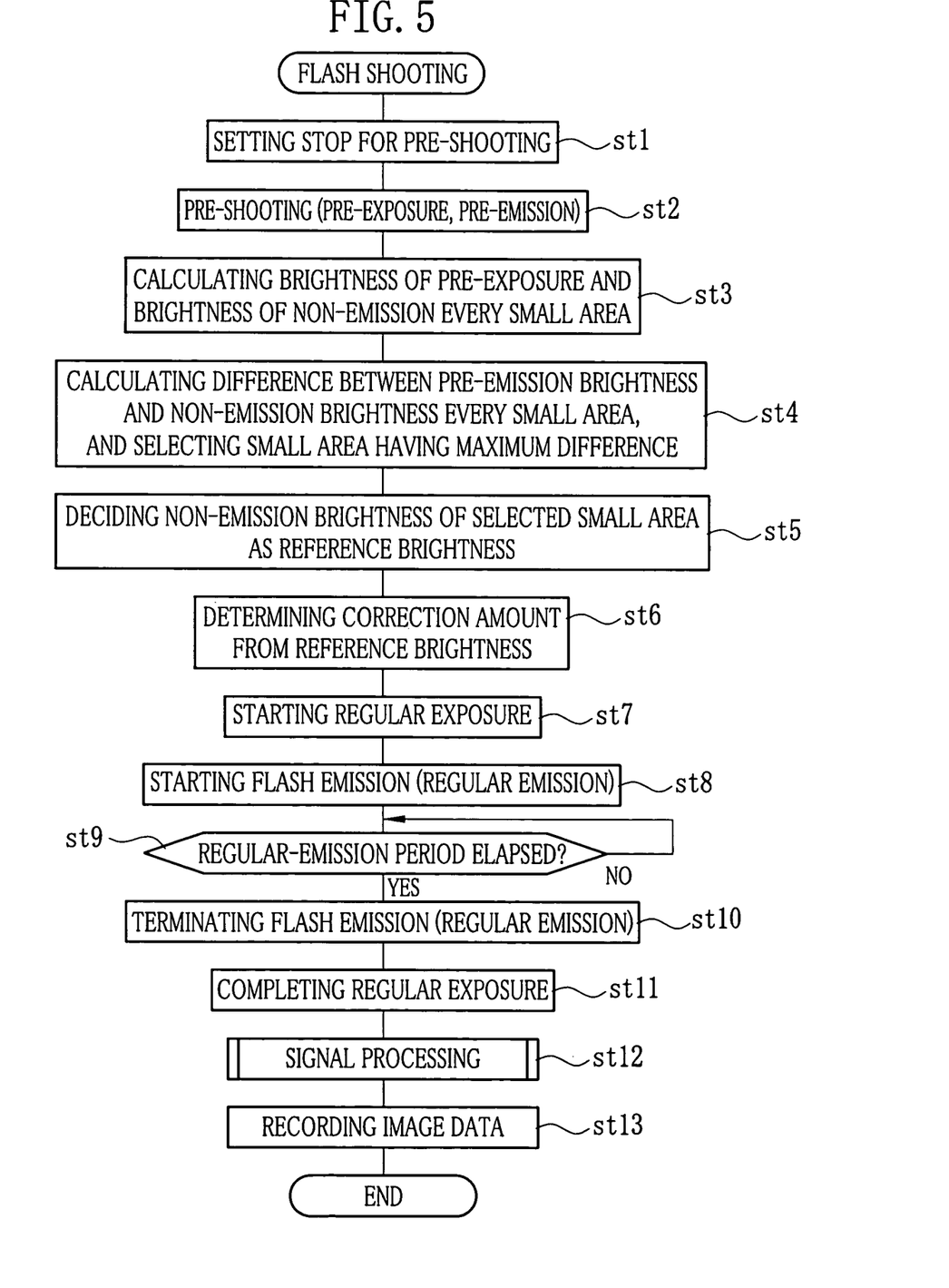
FIG. 5 is a flowchart showing a procedure executed at a time of flash shooting.

As shown in FIG. 5, the system controller 22 changes the stop of the taking lens unit 12 to a predetermined value for the pre-shooting (st1), and activates the CCD image sensor 24 to perform the pre-exposure with a predetermined electronic shutter speed (st2). During the pre-exposure, the pre-emission signal is sent to the charge and discharge circuit 35. In response to the input of the pre-emission signal, the charge and discharge circuit 35 actuates the flash discharge tube 34 to emit the flash light for a predetermined flash period.

In this way, the pre-emission of a predetermined flash amount is performed during the pre-exposure. The flash light of the pre-emission is reflected by the subject and the reflected flash light is received by the CCD image sensor 24. After completion of the pre-exposure, the image signal is outputted from the CCD image sensor 24. Noise of the outputted image signal is removed in the signal processor 26. Successively, the image signal is amplified with a predetermined gain and is converted into the image data of each pixel. The converted image data is transferred to the light-amount corrector 30.

On the basis of the image data outputted form the signal processor 26, the light-amount corrector 30 executes the brightness calculating process (st3), during which the brightness data of pre-emission is calculated with respect to each of the divided small areas 40 of the shooting frame 38. In addition, the brightness data of the non-emission (through-image shooting) is also calculated.

After calculating the brightness data with respect to all of the small areas 40, the reference setting process is executed to select the small area 40 having the maximum difference between the brightness data of the pre-emission and the brightness data of the non-emission (st4). Since the brightness data of the non-emission of the selected small area 40 is the brightness data of the ambient light applied to the main subject, this brightness data is set as the reference brightness data (st5). The light amount corrector 30 executes the correction-amount determining process to derive the correction amount of the flash amount of the regular emission, which corresponds to the reference brightness data, with reference to the LUT 31 (st6). The derived correction amount is sent to the system controller 22.

After the system controller 22 has received the correction amount of the flash amount of the regular emission, the regular shooting is started. The stop of the taking lens unit 12 is set, and then the regular exposure of the CCD image sensor 24 is started (st7). Moreover, the regular-emission start signal is inputted from the system controller 22 into the charge and discharge circuit 35. Upon the input of the regular-emission start signal, flash emission is commenced by the charge and discharge circuit 35 to radiate the flash light from the flash window 14 toward the subject (st8).

When the regular-emission period, which is corrected on the basis of the correction amount derived by the light-amount corrector 30 such as described above, has passed from the input of the regular-emission start signal (st9), the regular-emission stop signal is sent from the system controller 22 to the charge and discharge circuit 35 to terminate the flash emission (st10). In this way, the regular emission is performed during the regular exposure of the CCD image sensor 24. The flash light of the regular emission is radiated to the subject and the reflected light thereof is received by the CCD image sensor 24.

After completion of the regular exposure (st11), the image signal of the regular exposure is outputted from the CCD image sensor 24. Noise of the image signal is removed in the signal processor 26. Successively, the image signal is amplified and is converted into the image data. The processes of the white balance, the gamma correction and so forth are executed for the image data. And then, the image data of one frame is compressed (st12). The compressed image data is recorded in the memory card 16 via the interface circuit 32 (st13).

As described above, the area of the main subject located within the shooting frame is accurately identified. Thus, it is possible to accurately derive the brightness of the ambient light applied to the main subject and it is possible to properly determine the correction amount of the flash amount of the regular emission in consideration of the influence of the ambient light. In virtue of this, the main subject is taken by the regular shooting with proper exposure and without occurrence of chroma clip of highlight.

Figure 6:
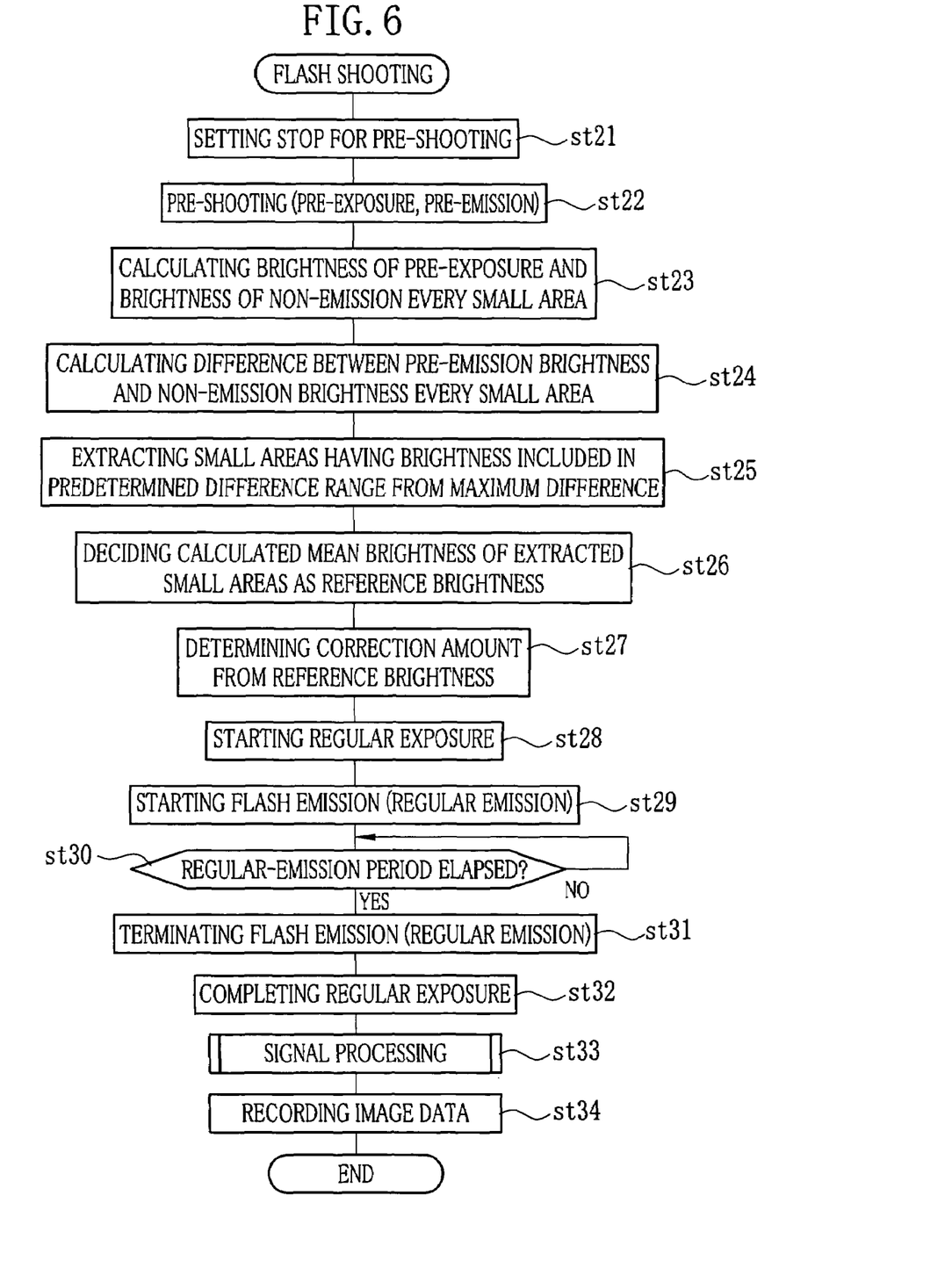
FIG. 6 is a flowchart showing another procedure executed at the time of flash shooting.

In the meantime, FIG. 6 shows a sequence of the second embodiment according to the present invention. The second embodiment is identical with the first embodiment except that the reference setting process is different. In the reference setting process of this embodiment, the light-amount corrector 30 calculates the difference between the brightness data of the pre-emission and the brightness date of the non-emission with respect to each of the small areas 40 (st24). After that, the maximum value of the differences is derived. The small areas 40 having a predetermined brightness difference from the maximum value (which is 3 EV or less, for example) are extracted (st25). Mean brightness data of the extracted small areas 40 is set as the reference brightness data (st26). Then, the correction amount of the flash amount of the regular emission corresponding to the reference brightness data is derived with reference to the LUT 31 (st27). In this way, it is possible to derive the correction amount in consideration of the ambient light applied to the periphery of the main subject.

In the foregoing embodiment, the exposure time of the regular shooting is 50 ms, the exposure time of the non-emission is 12.5 ms, and the obtained integration value of the CCD is quadruplicated. The present invention, however, is not limited to these numeric values. Further, in the foregoing embodiment, the predetermined brightness difference is 3 EV. However, the present invention is not limited to this numeric value. For example, the predetermined brightness difference may be 2 EV.

The above embodiments relate to the electronic still camera. However, the present invention is not limited to this kind of the camera, and may be adopted to a camera-equipper cell-phone and a camera-equipped PDA.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device having an image sensor for taking a subject image, comprising:
   a flash unit for emitting a flash, said flash unit emitting the flash before regular shooting to perform pre-emission when the regular shooting is instructed, and said flash unit emitting the flash in synchronization with the regular shooting to perform regular emission;
   a signal extractor for extracting an image signal of the subject image taken by said image sensor during a period of non-emission elapsing just before the pre-emission and the regular shooting without pre-emission;
   a light-amount corrector for calculating a difference between subject brightness of said non-emission and subject brightness of said pre-emission on the basis of said image signal with respect to each of divided small areas of a shooting frame of said image sensor, said light-amount corrector selecting the small area, which has the maximum brightness difference, to derive a correction amount of a flash amount of said regular emission on the basis of the subject brightness of the non-emission of the selected small area; and
   a light-amount controller for controlling said flash unit so as to perform said regular emission with the flash amount corrected in accordance with said correction amount derived by said light-amount corrector.

2. The imaging device according to claim 1, wherein the period of said non-emission is from a moment at which said shooting has been instructed, to said pre-emission.

3. The imaging device according to claim 1, wherein an actual exposure time of said image sensor of said non-emission is set so as to be shorter than a proper exposure time, and an image signal obtained during the actual exposure time and outputted from said image sensor is multiplied by a ratio of said actual exposure time to said proper exposure time to correct this image signal, the subject brightness of said non-emission being calculated from the corrected image signal.

4. The imaging device according to claim 1, wherein an actual exposure time of said image sensor of said pre-emission is set so as to be shorter than a proper exposure time of said regular emission.

5. The imaging device according to claim 1, further comprising:
   a look-up table for storing correction data representing a relation between the subject brightness of said non-emission and said correction amount of said flash amount, said light-amount corrector deriving said correction amount with reference to said look-up table.

6. The imaging device according to claim 5, wherein said light-amount controller controls a period of said regular emission in accordance with said correction amount.

7. An imaging device having an image sensor for taking a subject image, comprising:
   a flash unit for emitting a flash, said flash unit emitting the flash before regular shooting to perform pre-emission when the regular shooting is instructed, and said flash unit emitting the flash in synchronization with the regular shooting to perform regular emission;
   a signal extractor for extracting an image signal of the subject image taken by said image sensor during a period of non-emission elapsing just before the pre-emission and the regular shooting without pre-emission;
   a light-amount corrector for calculating a difference between subject brightness of said non-emission and subject brightness of said pre-emission on the basis of said image signal with respect to each of divided small areas of a shooting frame of said image sensor, said light-amount corrector selecting the small areas, which have the brightness difference included within a predetermined EV value from the maximum brightness difference, to derive a correction amount of a flash amount of said regular emission on the basis of the mean subject brightness of the non-emission of the selected small areas; and
   a light-amount controller for controlling said flash unit so as to perform said regular emission with the flash amount corrected in accordance with said correction amount derived by said light-amount corrector.

8. The imaging device according to claim 7, wherein the period of said non-emission is from a moment at which said shooting has been instructed, to said pre-emission.

9. The imaging device according to claim 7, wherein an actual exposure time of said image sensor of said non-emission is set so as to be shorter than a proper exposure time, and an image signal obtained during the actual exposure time and outputted from said image sensor is multiplied by a ratio of said actual exposure time to said proper exposure time to correct this image signal, the subject brightness of said non-emission being calculated from the corrected image signal.

10. The imaging device according to claim 7, wherein an actual exposure time of said image sensor of said pre-emission is set so as to be shorter than a proper exposure time of said regular emission.

11. The imaging device according to claim 7, further comprising:
    a look-up table for storing correction data representing a relation between the subject brightness of said non-emission and said correction amount of said flash amount, said light-amount corrector deriving said correction amount with reference to said look-up table.

12. The imaging device according to claim 11, wherein said light-amount controller controls a period of said regular emission in accordance with said correction amount.

* * * * *